Patented Mar. 22, 1938

2,111,622

UNITED STATES PATENT OFFICE 2,111,622

CAST SYNTHETIC RESINOUS PRODUCTS AND PROCESS FOR MAKING THE SAME

Rudolph Max Goepp, Jr., Tamaqua, Pa., assignor to Atlas Powder Company, Wilmington, Del., a corporation of Delaware No Drawing. Application October 1, 1936, Serial No. 103,533

6 Claims. (Cl. 106—22)

This invention is concerned with cast synthetic resinous products, and, more particularly, with the hard, transparent materials of the urea-formaldehyde type.

The object of my invention is to prepare cast urea-formaldehyde resins of improved quality, in respect to luster, transparency, mechanical strength, freedom from color, resistance to thermal shock, and resistance to spontaneous cracking.

It is a further object of this invention to facilitate the vapor phase removal of volatile material from the cast material during the process of manufacture. The ideal resinous cast material should be hard enough to take a high polish, sufficiently flexible to be turned and otherwise worked, stable to heat, and show no tendency to crack on standing.

From a manufacturing standpoint, the cast material should be a thin fluid when cast, to allow all entrapped air bubbles to rise to the surface, and it should then harden, on heating, to a uniform hard, yet tough mass, of any desired thickness. This demands that the curing process should not evolve any volatile material, since any volatile material generated in the interior of a large mass could not be lost by diffusion, and would remain to cause strains, slow hydrolytic decomposition, and eventual failure of the material.

In actual practice, it is impossible to achieve a non-volatile cure. In the first place, the curing process itself involves condensation reactions in which water and formaldehyde are split off. In the second place, a certain amount of fluid must be present in the liquid product to make casting possible, and to allow bubbles to escape. Since the condensation of urea and formaldehyde for casting purposes usually produces a hydrophile colloid, some water at least must be present in the liquid before casting, and since free formaldehyde must be present to have curing take place, this volatile component must also be present before casting. An excess of formaldehyde is harmful, because it may cause opacity.

A certain amount of water in a cast resin appears to confer desirable plasticity, but any excess is harmful. An excess can be removed by diffusion and evaporation from the casting during the cure, but this diffusional drying can take place to a depth of only about one fourth of an inch. Accordingly, cast material thicker than one-half inch cannot be cured uniformly. A thick case-hardened casting with a more plastic interior is desirable for certain purposes, e. g. resistance to mechanical shock, but the case-hardening sets up stresses like those in a Prince Rupert's drop, and the non-uniformity of the product makes it unsuitable for turnery material.

Also, the loss of volatiles by diffusion leaves pores in the cured material through which moisture can re-enter, so that material of this type tends to swell in humid surroundings, and dry out again under arid conditions.

One of the known methods for removing volatiles is by vacuum evaporation. It is known that removal of volatiles under vacuum is improved by adding a substance of low volatility, compatible with the liquid resinous product. Such an addendum appears to aid the removal of volatiles by diminishing the viscosity of the liquid resin, and in addition usually plasticizes the finished product. Whatever the mode of operation, the result of adding these compounds is to increase removal of volatiles, and to enhance strength and resistance.

Among the compounds already suggested for the purpose are glacial acetic acid, ethylene glycol, di- or tri-ethylene glycol, glycerol, sucrose, and benzyl alcohol. Glacial acetic acid is objectionable, since the high acidity tends to accelerate reaction during the evaporation period, thus increasing viscosity and adding to the difficulty of volatiles removal. Ethylene glycol and its polymers, when used in amounts sufficient to expedite evaporation, tend to make the cured material a little too soft. Glycerol is somewhat better, but not completely satisfactory. Sucrose tends to be inverted by the acidity of the material during the evaporation and cure, giving rise to the less stable invert sugar which is sensitive to overheating and lacks the chemical and physical stability of the polyhydric alcohols.

I have found that the hexahydric alcohol sorbitol is very efficient for the purposes described above. This material has very high solubility in water, and is very compatible with both the liquid resinous product and the final cured casting. It facilitates removal of volatile material under vacuum, and thins the liquid product sufficiently to allow bubbles to be removed prior to casting.

Cast products made with sorbitol are distinguished by exceptional brilliance and transparency, which may arise from the fact that sorbitol can react readily with formaldehyde under acid conditions. Hence, the sorbitol fixes any excess formaldehyde present before curing or liberated during the process, and prevents it from clouding the resinous material.

The use of sorbitol need not be restricted to transparent products, but may be used in cast resins containing opaque materials added for decorative purposes, or to confer mechanical strength or increased weather resistance. In these applications, the functions of the sorbitol are primarily to aid in the removal of volatiles and to act as a plasticizer, thus improving the stability, mechanical strength and thermal resistance.

The use of sorbitol in urea-formaldehyde cast products is of general applicability, and does not demand any particular mode of preparing the liquid resinous product prior to casting.

In the preferred embodiment of my invention, the sorbitol is added to the batch immediately before the final evaporation prior to casting, but I do not limit myself to addition at this stage. I may add the sorbitol to the mixture at the beginning, in which case a resin of slightly different properties is obtained, due to the fact that the sorbitol enters, in part at least, into reaction earlier in the process than when added just before the evaporation.

The amount of sorbitol used is not very critical. It may be used in proportions not exceeding 20% by weight of the finished material, and preferably in an amount greater than 2% by weight of the finished material.

The sorbitol used may be a pure product, or else the technical mixture obtained by the alkaline reduction of glucose may be used. This mixture consists of sorbitol with minor amounts of other polyhydric bodies.

The following example illustrates one method of carrying out this invention, but it is to be understood that my invention is not to be considered as limited thereby. It is obvious that many other variations of the process may be employed, alike only in that sorbitol is added prior to vacuum distillation.

Example 150 grams of urea are dissolved in 400 cc. formaldehyde solution, and the pH adjusted to 6.5, by adding triethanolamine. The mixture is heated to boiling, then the pH is brought to 5.5 by adding 10% aqueous citric acid, and the solution refluxed 48 minutes. It is then evaporated under vacuum for 47 minutes, using a bath at 200° for heating. Air is bubbled through the mixture during the evaporation. Refluxing is resumed for 55 minutes. The pH is then lowered by addition of 2.5 cc. of citric acid, 9 grams of dry crystalline sorbitol are stirred in, heated to dissolve in the viscous liquid, then the final evaporation under vacuum is carried out as above. Between 40 and 50% of the volatiles originally present are removed in this way.

After standing for 10-15 minutes to allow bubbles to rise out of the liquid, the batch is cast into porous molds, and cured at 65° C. for 3 weeks. The product is brilliantly clear, hard, and can be turned, cut, sawed and polished.

The above example is typical of the way my invention may be carried out, but I do not limit myself thereto. For regulating the pH, various organic acids and bases, already known to the art, may be used, such as acetic, or lactic, or tartaric acids, and pyridine, mono-, di-, or triethanolamine. I may replace a part or all of the urea with thiourea, to give a more water-resistant product. I may add waterproofing agents such as castor oil, incorporate dyes or pigments to enhance the appearance, or otherwise modify the properties of the material.

I may remove the excess volatiles by adding an excess of volatile solvent, and boiling off under atmospheric pressure, or I may spray-dry the liquid product, or pass a rapid stream of inert gas through the liquid, to remove the volatile material in the vapor phase.

In the following claims it is to be understood that by the term "cast resinous product of the urea formaldehyde type" is meant cast resinous products comprising the condensation products of urea, thiourea as well as products giving rise to urea or thiourea such as ammonium cyanate, with all types and sources of formaldehyde such as aqueous formaldehyde, gaseous formaldehyde, hexamethylene tetramine and paraform.

Having described my invention what I claim is as follows:

1. In the process of preparing a cast resinous product of the urea-formaldehyde type by reacting the components in solution, removing the volatile unreacted material and reaction products in the vapor phase, casting and heat curing, the step which comprises adding sorbitol to the reaction mixture prior to the final vapor phase elimination of volatiles.

2. In the process of preparing a cast resinous product of the urea-formaldehyde type by reacting the components in solution, removing the volatile unreacted material and reaction products in the vapor phase, casting and heat curing, the step which comprises adding sorbitol to the reaction mixture just prior to the final vapor phase elimination of volatiles.

3. The process set forth in claim 1, and wherein the sorbitol is added in an amount of from 2 to 20% by weight of the finished product.

4. The process set forth in claim 2 and wherein the sorbitol is added in an amount of from 2 to 20% by weight of the finished product.

5. A cast resinous product of the urea-formaldehyde type containing sorbitol.

6. A cast resinous product of the urea-formaldehyde type containing sorbitol in an amount of from 2 to 20% by weight.

RUDOLPH MAX GOEPP, JR.